United States Patent
Kimura et al.

(10) Patent No.: US 10,120,185 B2
(45) Date of Patent: Nov. 6, 2018

(54) IMAGE PROJECTION APPARATUS AND COMPENSATION METHOD

(71) Applicants: Yuji Kimura, Tokyo (JP); Toyoki Tanaka, Tokyo (JP)

(72) Inventors: Yuji Kimura, Tokyo (JP); Toyoki Tanaka, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/829,036

(22) Filed: Dec. 1, 2017

(65) Prior Publication Data
US 2018/0172984 A1    Jun. 21, 2018

(30) Foreign Application Priority Data

Dec. 21, 2016 (JP) .................... 2016-248465

(51) Int. Cl.
  *G02B 26/10* (2006.01)
  *G09G 3/02* (2006.01)
  (Continued)

(52) U.S. Cl.
  CPC ........... *G02B 26/101* (2013.01); *G09G 3/025* (2013.01); *G09G 3/346* (2013.01); *H04N 1/036* (2013.01);
  (Continued)

(58) Field of Classification Search
  CPC .............. G02B 26/101; G02B 26/105; G02B 27/0031; H04N 9/3194
  See application file for complete search history.

(56) References Cited

U.S. PATENT DOCUMENTS

2003/0015652 A1\* 1/2003 Kandori ............ G02B 26/101
                                                                250/234
2003/0021497 A1    1/2003 Kandori et al.
(Continued)

FOREIGN PATENT DOCUMENTS

JP    2002-365568    12/2002

OTHER PUBLICATIONS

Partial European search report for European Patent Application No. 17207288.6 dated May 30, 2018.
(Continued)

*Primary Examiner* — Kenneth J Malkowski
(74) *Attorney, Agent, or Firm* — IPUSA, PLLC (57) ABSTRACT

An image projection apparatus includes a light emission unit for emitting laser light; a light scanning unit for projecting an image on a drawing area by reflecting the light and scanning the reflected light; a light detection unit arranged outside of the drawing area; a detection unit for detecting, according to a deviation from a desired value of a first pixel detected by the light detection unit when the light is horizontally scanned in a first direction and a deviation from a desired value of a second pixel detected by the light detection unit when the light is horizontally scanned in a second direction, each of a phase deviation of the laser light in a horizontal scanning direction and a swing angle fluctuation of the light scanning unit; and a compensation unit configured to compensate for each of the phase deviation and the swing angle fluctuation.

11 Claims, 8 Drawing Sheets

(51) Int. Cl.
*H04N 5/74* (2006.01)
*H04N 1/036* (2006.01)
*H04N 1/113* (2006.01)
*G09G 3/34* (2006.01)
*H04N 9/31* (2006.01)

(52) U.S. Cl.
CPC .............. *H04N 1/113* (2013.01); *H04N 5/74* (2013.01); *H04N 9/3135* (2013.01); *H04N 9/3185* (2013.01); *H04N 9/3194* (2013.01)

(56) References Cited

U.S. PATENT DOCUMENTS

| | | | |
|---|---|---|---|
| 2010/0033691 A1* | 2/2010 | Hung | H04N 9/3129 353/70 |
| 2012/0275001 A1 | 11/2012 | Ishibashi | |
| 2014/0285536 A1 | 9/2014 | Haruna et al. | |
| 2014/0293235 A1 | 10/2014 | Azuma et al. | |
| 2017/0180690 A1* | 6/2017 | Jackson | H04N 9/14 |

OTHER PUBLICATIONS

Extended European search report for European Patent Application No. 17207288.6 dated Aug. 16, 2018.

* cited by examiner

IMAGE PROJECTION APPARATUS AND COMPENSATION METHOD

BACKGROUND OF THE INVENTION

1. Field of the Invention

The present invention relates to an image projection apparatus and a compensation method.

2. Description of the Related Art

Conventionally, image projection apparatuses (what are termed as "laser projectors") are known which that project an image on a screen by scanning laser light in two dimensions on the screen. In the image projection apparatuses described above, there is an apparatus that is configured to scan the laser light in two dimensions by driving a MEMS (Micro Electro Mechanical Systems) mirror used for reflecting the laser light, and by sequentially changing the reflection direction.

In general, this type of image projection apparatus uses a relatively-fast resonance drive when driving the MEMS mirror in the horizontal direction. However, in the case where the resonance drive is used, a phase difference is created between the drive signal and the displacement of the MEMS mirror. In the case where this type of phase difference occurs, a phase deviation occurs in the horizontal scanning direction for the projection image projected on the screen. Therefore, conventionally, a technique has been proposed that enables to overcome this type of phase deviation in the horizontal scanning direction (refer to, for example, Patent Document 1).

CITATION LIST

Patent Document

[Patent Document 1] Japanese Unexamined Patent Application Publication No. 2002-365568

SUMMARY OF THE INVENTION

Technical Problem

Here, in the image projection apparatuses which use the MEMS mirror, there is a case in which not only the phase deviation in the horizontal scanning direction occurs, but also a swing angle fluctuation (deviation) of the MEMS mirror occurs due to the influence of the temperature, atmospheric pressure, or the like. When the swing angle fluctuation of the MEMS mirror occurs, a size fluctuation occurs in the projection image projected on the screen. However, with the technique described in Patent Document 1, the phase deviation in the horizontal scanning direction may be detected and compensated for, but the swing angle fluctuation cannot be detected nor compensated for. As a result, conventionally, there is a problem in that the accuracy of a position, to which the laser light is emitted, cannot be improved.

In view of the above problem, an object of the present invention is to enable improvement of the accuracy of a position to which the laser light is emitted.

Solution to Problem

In order to solve the problem described above, an image projection apparatus (1) according to an embodiment of the present invention is provided. The image projection apparatus (1) includes a light emitting unit (21) configured to emit laser light; a light scanning unit (310) configured to project an image on a drawing area (50A) by reflecting the laser light and scanning the reflected laser light; a light detection unit (60) arranged outside of the drawing area (50A); a detection unit (404) configured to detect, according to a deviation from a desired value of a first pixel detected by the light detection unit (60) when the laser light is being horizontally scanned in a first direction and a deviation from a desired value of a second pixel detected by the light detection unit (60) when the laser light is being horizontally scanned in a second direction, each of a phase deviation of the laser light in a horizontal scanning direction and a swing angle fluctuation of the light scanning unit (310); and a compensation unit (405) configured to compensate for each of the phase deviation of the laser light in the horizontal scanning direction and the swing angle fluctuation of the light scanning unit (310) detected by the detection unit (404).

It should be noted that reference numerals in the above parentheses are provided in order to facilitate easy understanding, are just examples, and are not limited to aspects illustrated in the drawings.

Advantageous Effects of Invention

According to an embodiment of the present invention, it is possible to improve the accuracy of a position to which the laser light is emitted.

DETAILED DESCRIPTION OF THE PREFERRED EMBODIMENTS

In the following, an embodiment of the present invention will be described while making reference to the drawings.

(Schematic Structure of an Image Projection Apparatus 1)

Figure 1A:
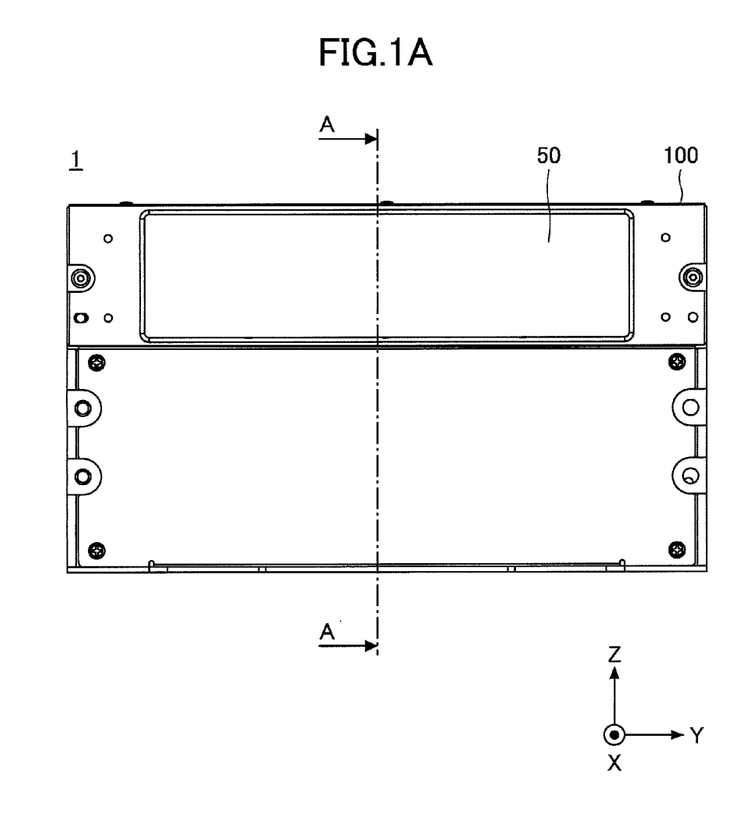
FIG. 1A and FIG. 1B are drawings illustrating a schematic structure of an image projection apparatus according to an embodiment of the present invention.
Figure 1B:
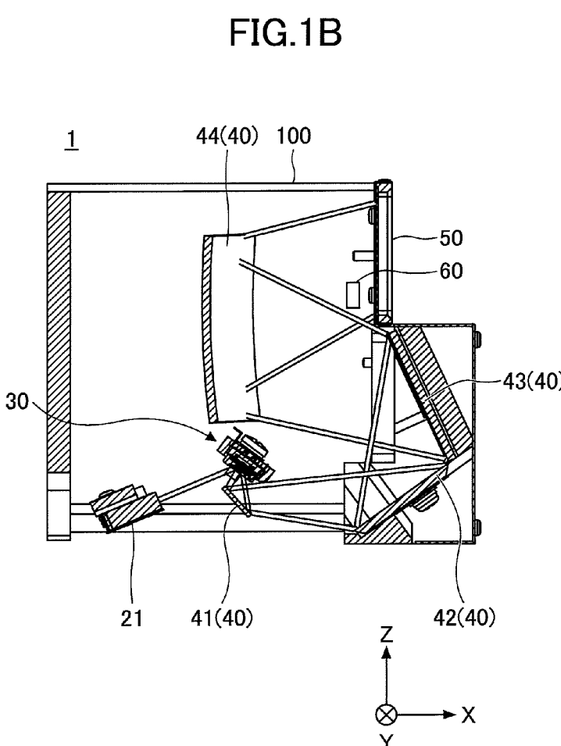

FIG. 1A and FIG. 1B are drawings illustrating a schematic structure of an image projection apparatus 1 according to an embodiment of the present invention. FIG. 1A is a drawing illustrating an external appearance (front) of the image projection apparatus 1. FIG. 1B is an A-A cross-sectional view illustrating an internal structure of the image projection apparatus 1.

As illustrated in FIG. 1A, the image projection apparatus 1 includes a screen 50 on a front surface (surface in X-axis positive direction in the figure) of a housing of the image projection apparatus 1. The screen 50 is an example of a "projection surface" of an embodiment of the present invention. Further, as illustrated in FIG. 1B, the image projection apparatus 1 includes an LD module 21, a light scanning unit 30, and an optical system 40 inside of the housing 100. In an example illustrated in FIG. 1B, the optical system 40 includes a reflection mirror 41, a reflection mirror 42, a reflection mirror 43, and a concave mirror 44.

The image projection apparatus 1 described above is enabled to project an image on the screen 40 by reflecting laser light emitted from the LD module 21 by the light scanning unit 30 and the optical system 40, and by scanning the reflected laser light onto the screen 50. The above-described light scanning is realized by driving the MEMS mirror 310 of the light scanning unit 30 (refer to FIG. 2 and FIG. 3), and by sequentially changing the reflection direction of the laser light.

As the image projection apparatus 1, for example, an in-vehicle head-up display can be listed. In this case, for example, the image projection apparatus 1 is arranged within the dashboard in front of the driving seat of the vehicle. Further, the image projection apparatus 1 is enabled to display on the windshield of the vehicle display images of various types of information items (e.g., speedometer, route guidance, and the like) projected on the screen 50, and thus, the driver is enabled to see and recognize the display images.

(Specific Structure of the Image Projection Apparatus 1)

Figure 2:
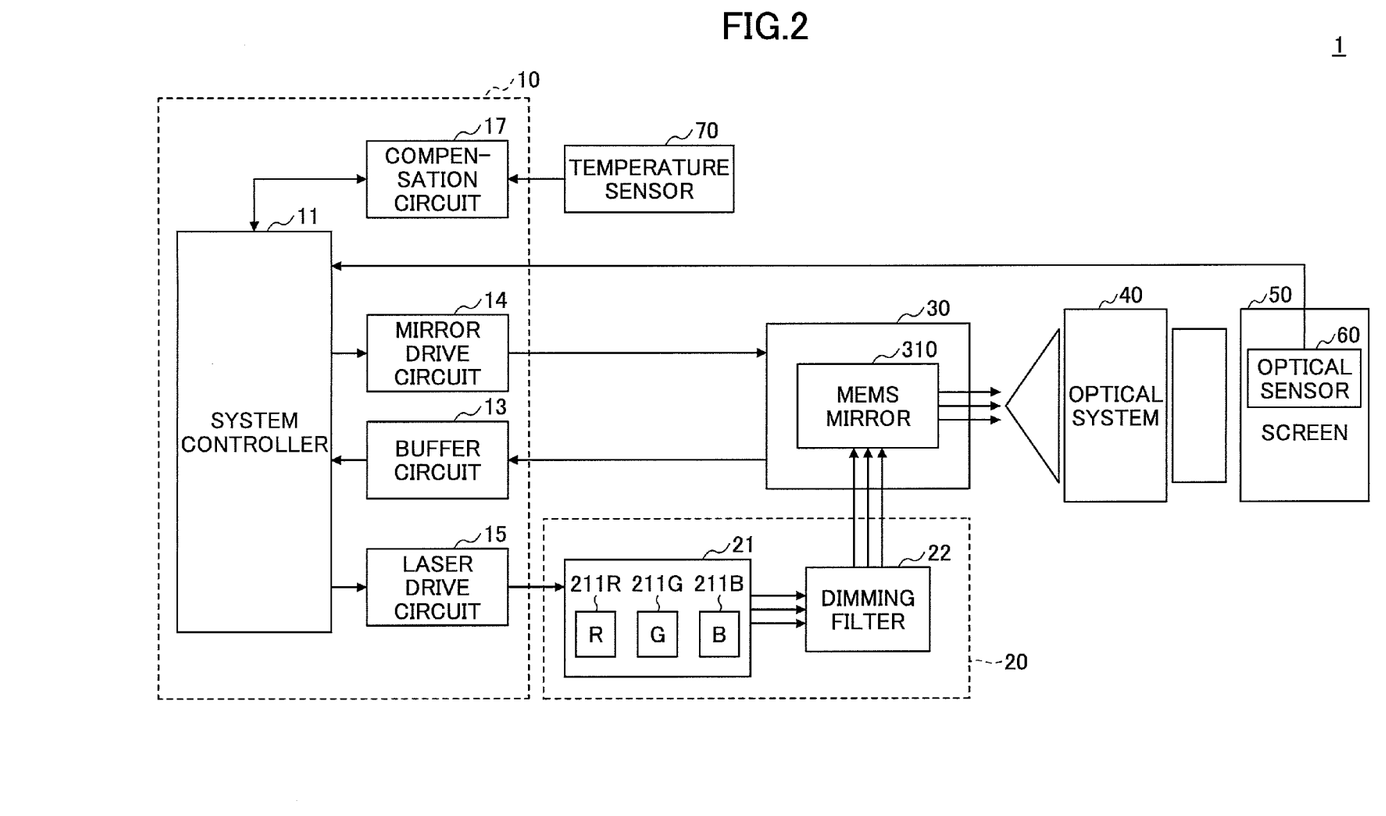
FIG. 2 is a drawing illustrating a specific structure of an image projection apparatus according to an embodiment of the present invention.

FIG. 2 is a drawing illustrating a specific structure of an image projection apparatus 1 according to an embodiment of the present invention. As illustrated in FIG. 2, the image projection apparatus 1 includes a circuit unit 10, a light source unit 20, a light scanning unit 30, an optical system 40, a screen 50, an optical sensor 60, and a temperature sensor 70. It should be noted that a compensation circuit 17, the optical sensor 60, and the temperature sensor 70 will be further described later as a further structure of the image projection apparatus 1.

The circuit unit 10 controls the light source unit 20 and the light scanning unit 30. The circuit unit 10 includes a system controller 11, a buffer circuit 13, a mirror drive circuit 14, a laser drive circuit 15 and the compensation circuit 17. The light source unit 20 includes an LD module 21 and a dimming filter 22. The LD module 21 is an example of a "light emitting unit" according to an embodiment of the present invention, and includes a laser 211R, a laser 211G, and a laser 211B. The light scanning unit 30 includes a MEMS mirror 310. It should be noted that a specific structure of the light scanning unit 30 will be described later while making reference to FIG. 3.

The system controller 11 is enabled to supply an angle control signal to the mirror drive circuit 14. The mirror drive circuit 14 is enabled to horizontally drive and vertically drive the MEMS mirror 310 by supplying drive signals to piezoelectric actuators 331, 332, 341, and 342 (refer to FIG. 3) based on the angle control signal from the system controller 11.

Further, the system controller 11 is enabled to supply a digital video signal to the laser drive circuit 15. The laser drive circuit 15 is enabled to cause the lasers 211R, 211G, and 311B to emit laser light by supplying drive currents to the lasers 211R, 211G, and 211B of the light source unit 20 based on the video signal from the system controller 11.

The lasers 211R, 211G, and 211B emit the laser light based on the drive currents supplied from the system controller 11. The laser 211R is, for example, a red semiconductor laser, and emits light with a wavelength $\lambda R$ (e.g., 640 nm). The laser 211G is, for example, a green semiconductor laser, and emits light with a wavelength $\lambda G$ (e.g., 530 nm). The laser 211B is, for example, a blue semiconductor laser, and emits light with a wavelength $\lambda B$ (e.g., 445 nm). The light beams with respective wavelengths emitted from the lasers 211R, 211G, and 211B are combined by a dichroic mirror, etc., the light amount of the combined light is decreased to a predetermined light amount by the dimming filter 22, and the dimmed light is incident onto the MEMS mirror 310 of the light scanning unit 30.

The reflection direction of the laser light incident on the MEMS mirror 310 is changed according to the horizontal drive and the vertical drive of the MEMS mirror 310, and the reflected light is further repeatedly reflected by the optical system 40 and emitted onto the screen 50 (refer to FIG. 1). With the above operations, the optical scanning of the laser light is performed on the screen 50 and an image is projected on the screen 50.

(Specific Structure of the Light Scanning Unit 30)

Figure 3:
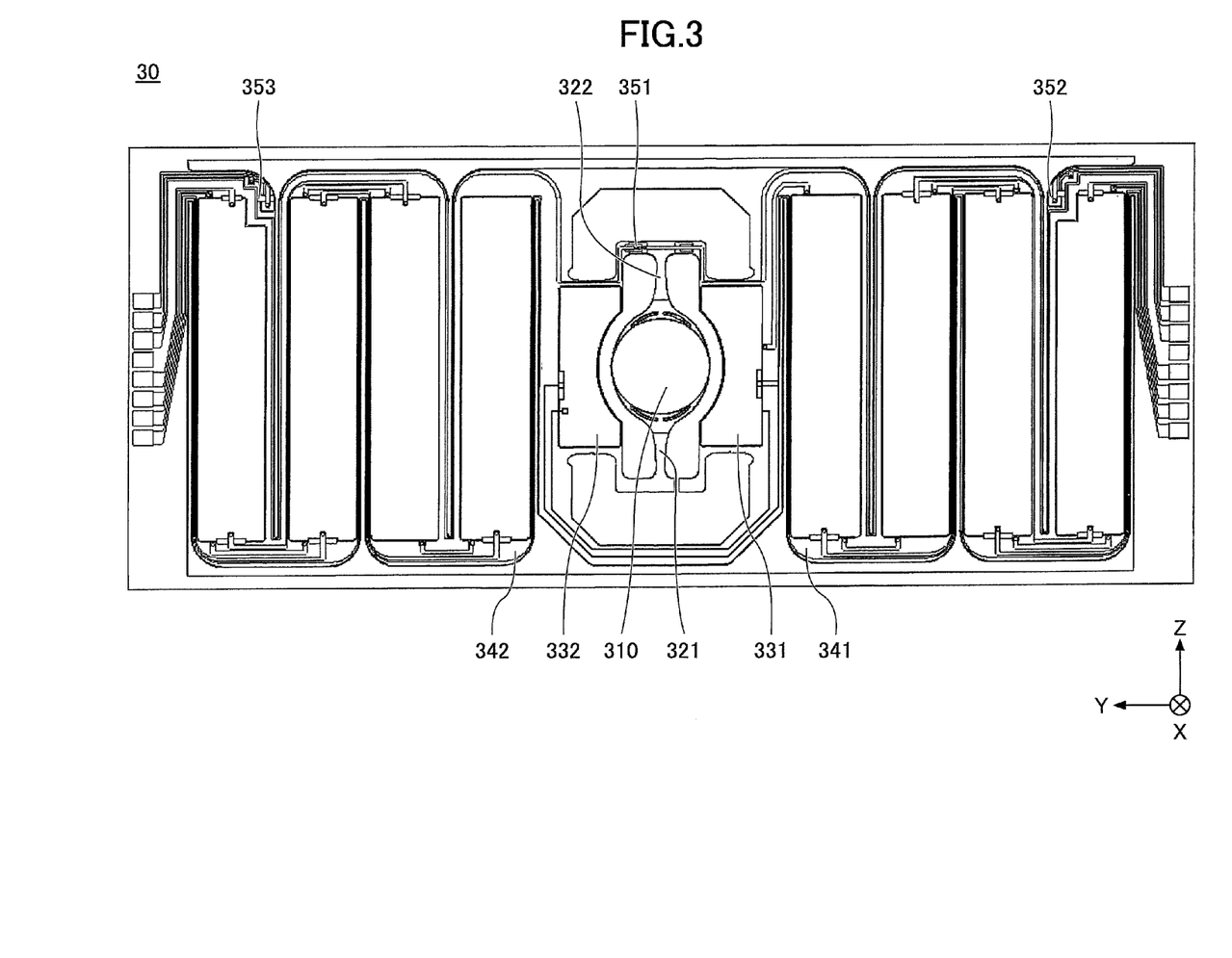
FIG. 3 is a drawing illustrating a specific structure of a light scanning unit according to an embodiment of the present invention.

FIG. 3 is a drawing illustrating a specific structure of a light scanning unit 30 according to an embodiment of the present invention. As illustrated in FIG. 3, the light scanning unit 30 includes a MEMS mirror 310, a torsion bar 321, a torsion bar 322, a piezoelectric actuator 331, a piezoelectric actuator 332, a piezoelectric actuator 341, a piezoelectric actuator 342, a displacement sensor 351, a displacement sensor 352, and a displacement sensor 353.

The MEMS mirror 310 is an example of a "light scanning unit" according to an embodiment of the present invention. Both sides of the MEMS mirror 310 are supported by a pair of the torsion bars 321 and 322 in such a way that the MEMS mirror 310 is enabled to rotate around an axis of the torsion bars. A pair of the piezoelectric actuators 331 and 332 are arranged in a direction (Y-axis direction in the figure) orthogonal to a direction (Z-axis direction in the figure) in which the torsion bars 321 and 322 are arranged, in such a way that the MEMS mirror 310 is sandwiched by the piezoelectric actuators 331 and 332. The piezoelectric actuators 331 and 332 respectively have a layered structure in which a plate-shaped elastic body and a piezoelectric element are layered. The piezoelectric actuators 331 and 332 are enabled to cause the MEMS mirror 310 to rotate in the horizontal direction (Y-axis direction in the figure) (horizontal drive) by having bending deformation of the piezoelectric elements caused by received drive voltages. The light scanning unit 30 is enabled to perform fast horizontal scanning of the laser light by horizontally driving the MEMS mirror 310 by using the resonance drive.

The piezoelectric actuators 341 and 342 are arranged outside the piezoelectric actuators 331 and 332. The piezoelectric actuators 341 and 342 respectively have a layered structure in which a plate-shaped elastic body and a piezoelectric element are layered. The piezoelectric actuators 341 and 342 are enabled to cause the MEMS mirror 310 to rotate in the vertical direction (Z-axis direction in the figure) (vertical drive) by having bending deformation of the piezoelectric elements caused by received drive voltages. It should be noted that non-resonance drive (e.g., sawtooth wave drive) is used for the vertical drive of the MEMS mirror 310.

The displacement sensor 351 is a sensor for detecting a tilt of the MEMS mirror 310 in the horizontal direction. The displacement sensors 352 and 353 are sensors for detecting a tilt of the MEMS mirror 310 in the vertical direction. Detected signals of the displacement sensors 351, 352, and 353 are fed back to the system controller 11 via, for example, the buffer circuit 13 (refer to FIG. 2). The detected signal of the displacement sensor 351 may be used for determining an emission timing of the laser light. Further, the detected signals of the displacement sensors 352 and 353 may be used for controlling the swing angle of the MEMS mirror 310 in the vertical direction to be in a desired range, or for other projection image adjustment.

(Further Structure of the Image Projection Apparatus 1)

As illustrated in FIG. 1, an image projection apparatus 1 according to an embodiment of the present invention includes the compensation circuit 17, the optical sensor 60, and the temperature sensor 70 as the further structure. The optical sensor 60 is an example of a "light detection unit" according to an embodiment of the present invention. The optical sensor 60 is arranged on the screen 50, and is enabled to detect the laser light emitted onto the light sensor 60 during the forward path and the return path of the horizontal scanning of the laser light. As the optical sensor 60, for example, a photodiode, etc., may be used.

The image projection apparatus 1 is enabled to identify a pixel (hereinafter, referred to as "first pixel") detected by the optical sensor 60 during the forward path of the horizontal scanning of the laser light.

Further, the image projection apparatus 1 is enabled to identify a pixel (hereinafter, referred to as "second pixel") detected by the optical sensor 60 during the return path of the horizontal scanning of the laser light. Further, the image projection apparatus 1 is enabled to, by using the control of the compensation circuit 17, detect and compensate for each of the phase deviation of the laser light in the horizontal scanning direction and the swing angle fluctuation of the MEMS mirror 310, based on a deviation of the first pixel from the desired value and a deviation of the second pixel from the desired value. The above-described point will be specifically described in the following. It should be noted that the temperature sensor 70 is a sensor used for detecting a temperature of the surroundings of the image projection apparatus 1. The temperature sensor 70 is used in the case where the temperature is included as a cause of the deviation of a processing result of the compensation circuit 17. Further, in the case where a photodiode is used as the optical sensor 60, a response time delay is generated between when the laser light passes the photodiode and when the detected signal is output. The response time delay changes according to the temperature of the surroundings of the photodiode. Therefore, the response time delay may be adjusted by having the temperature of the surroundings of the photodiode detected by the temperature sensor 70. In this case, it is preferable that the temperature sensor 70 be disposed in the vicinity of the photodiode.

(Functional Structure of the Compensation Circuit 17)

Figure 4:
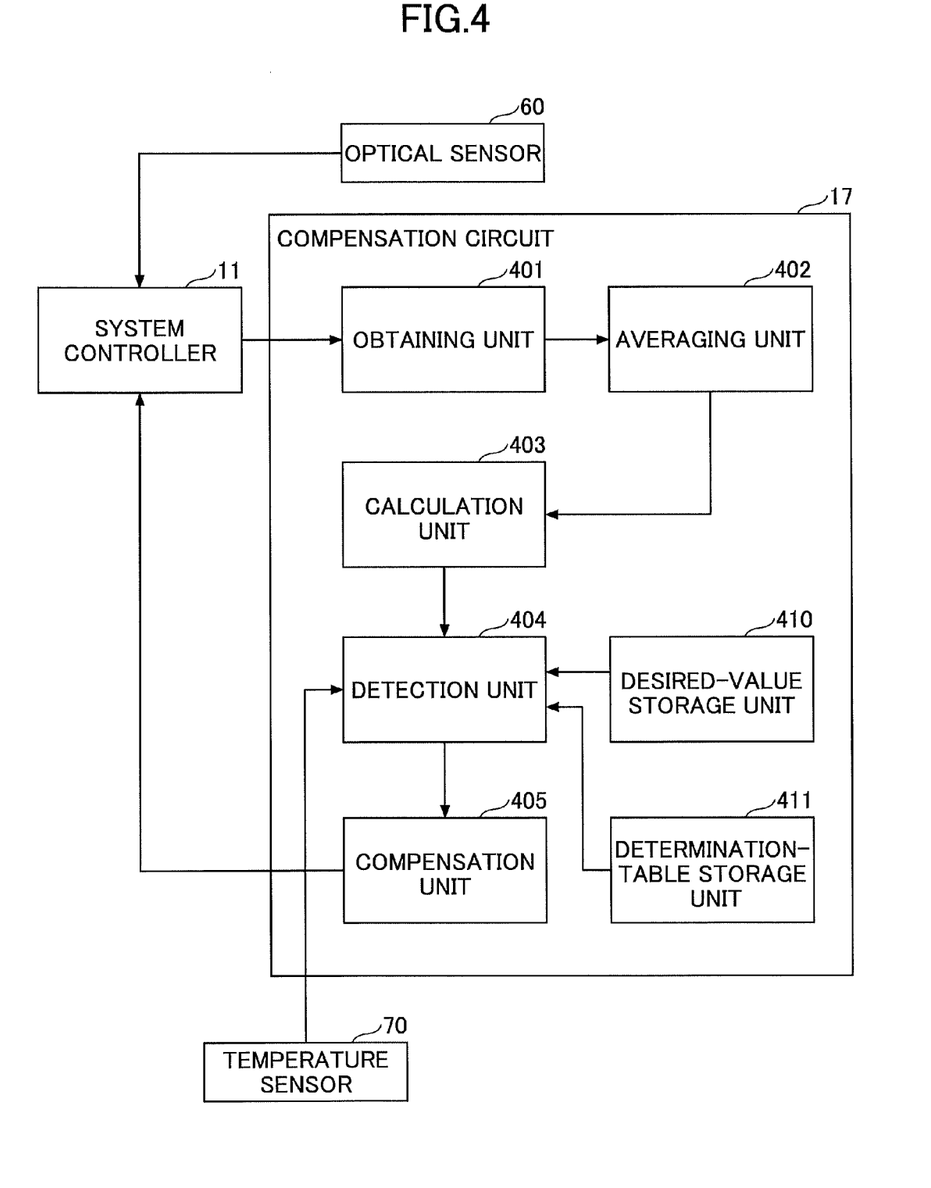
FIG. 4 is a drawing illustrating a functional structure of a compensation circuit according to an embodiment of the present invention.

FIG. 4 is a block diagram illustrating a functional structure of a compensation circuit 17 according to an embodiment of the present invention. In an example of FIG. 4, the compensation circuit 17 includes an obtaining unit 401, an averaging unit 402, a calculation unit 403, a detection unit 404, a compensation unit 405, a desired-value storage unit 410, and a determination-table storage unit 411.

The desired-value storage unit 410 stores a desired value of a pixel count value of the first pixel (hereinafter, referred to as a "first pixel count value"), which should be detected by the optical sensor 60 during the forward path of the horizontal scanning, and a desired value of a pixel count value of the second pixel (hereinafter, referred to as a "second pixel count value"), which should be detected by the optical sensor 60 during the return path of the horizontal scanning. In particular, in the present embodiment, the desired-value storage unit 410 stores a desired value of a sum of the first pixel count value and the second pixel count value, and a desired value of a difference between the first pixel count value and the second pixel count value. As the desired values, values are set which are based on the pixel count values that should be detected by the optical sensor 60 when there is no phase deviation of the laser light in the horizontal scanning direction and when there is no swing angle fluctuation of the MEMS mirror 310.

The determination-table storage unit 411 stores a determination table used for determining whether there is a phase deviation of the laser light in the horizontal scanning direction, and determining whether there is a swing angle fluctuation of the MEMS mirror 310 based on the first pixel count value and the second pixel count value. It should be noted that the determination table will be described in detail later while making reference to FIG. 6.

The obtaining unit 401 obtains detection results of the optical sensor 60. Specifically, the obtaining unit 401 obtains a pixel count value of the first pixel (first pixel count value) detected by the optical sensor 60 during the forward path of the horizontal scanning, and a pixel count value of the second pixel (second pixel count value) detected by the optical sensor 60 during the return path of the horizontal scanning, as the detection results of the optical sensor 60, from the system controller 11.

With respect to the above, the system controller 11 has a function as an identifying unit for identifying each of the first pixel count value and the second pixel count value by determining which pixel number of the laser light is emitted onto the screen when the detection of the optical sensor 60 is performed. It should be noted that this function may be included in the compensation circuit 17. Further, in the case where the optical sensor 60 is enabled to detect a plurality of consecutive pixels in the horizontal direction, the system controller 11 may identify, for example, a pixel detected first by the optical sensor 60 as the first pixel or the second pixel.

In the present embodiment, the obtaining unit 401 obtains the first pixel count value and the second pixel count value repeatedly (predetermined number of times). For example, in an area, outside of the drawing area, in which the optical sensor 60 is disposed, the horizontal scanning using reference light is performed for each frame. Therefore, the optical sensor 60 detects the first pixel and the second pixel for each frame. In response to the detection of the optical sensor 60, the obtaining unit 401 obtains the first pixel count value and the second pixel count value for each frame.

The averaging unit 402 calculates an average value of the predetermined number of the first pixel count values obtained by the obtaining unit 401, and an average value of the predetermined number of the second pixel count values obtained by the obtaining unit 401.

The calculation unit 403 calculates a sum of, and a difference between, the first pixel count value and the second pixel count value. In particular, in the present embodiment, because the averaging process is performed by the averaging unit 402, the calculation unit 403 calculates a sum of and a difference between an average value of the first pixel count values and an average value of the second pixel count values.

The detection unit 404 detects each of a phase deviation of the laser light in the horizontal scanning direction and a swing angle fluctuation of the MEMS mirror 310 according to a deviation of the first pixel detected by the optical sensor 60 from the desired value, and a deviation of the second pixel detected by the optical sensor 60 from the desired value.

In particular, in the present embodiment, because the averaging process is performed by the averaging unit 402, the detection unit 404 detects each of whether there is a phase deviation of the laser light in the horizontal scanning direction and whether there is a swing angle fluctuation of the MEMS mirror 310 according to a deviation of the sum calculated by the calculation unit 403 from the desired value, and a deviation of the difference calculated by the calculation unit 403 from the desired value.

In the case where the detection unit 404 detects that there is a phase deviation of the laser light in the horizontal scanning direction, the compensation unit 405 compensate for the phase deviation according to an amount of the phase deviation (that is, the pixel deviation amount from the desired value). For example, the compensation unit 405 receives an emission start timing of the laser light from the system controller 11, changes the emission start timing according to the phase deviation amount, and returns the changed emission start timing to the system controller 11. Alternatively, the compensation unit 405 may transmit to the system controller 11 an indication to change the emission start timing of the laser light according to the phase deviation amount. With the above operations, the emission start timing of the laser light emitted by the LD module 21 is changed, and thus, the phase deviation of the laser light in the horizontal scanning direction is compensated for.

Further, in the case where the detection unit 404 detects that there is a swing angle fluctuation of the MEMS mirror 310, the compensation unit 405 compensate for the swing angle fluctuation according to an amount of the swing angle fluctuation (that is, the pixel deviation amount from the desired value). For example, the compensation unit 405 receives a horizontal swing angle gain of the MEMS mirror 310 from the system controller 11, changes the horizontal swing angle gain according to the swing angle fluctuation amount, and returns the changed horizontal swing angle gain to the system controller 11. Alternatively, the compensation unit 405 may transmit to the system controller 11 an indication to change the horizontal swing angle gain of the MEMS mirror 310 according to the swing angle fluctuation amount. With the above operations, the swing angle of the MEMS mirror 310 is changed, and thus, the swing angle fluctuation of the MEMS mirror 310 is compensated for.

It should be noted that the desired-value storage unit 410 may store the desired value (or, adjustment value of the desired value) for each temperature detected by the temperature sensor 70. In this case, the detection unit 404 may detect each of whether there is a phase deviation of the laser light in the horizontal scanning direction and whether there is a swing angle fluctuation of the MEMS mirror 310, by using the desired value corresponding to the temperature detected by the temperature sensor 70. With the above operations, it becomes possible to cancel the change of a pulse output timing from the optical sensor 60 due to the influence of the temperature by using the desired value.

Further, in the case where the image projection apparatus 1 is enabled to set the emission start timing of the laser light for each of the forward path and the return path of the horizontal scanning, the compensation unit 405 may compensate for the emission start timing of the laser light for each of the forward path and the return path of the horizontal scanning according to the phase deviation amount of the laser light in the horizontal scanning direction.

Here, the compensation circuit 17 includes units including, for example, a CPU (Central Processing Unit), a ROM (Read Only Memory), a RAM (Random Access Memory), etc. In other words, each of the functions of the compensation circuit 17 described above is realized by the units included in the compensation circuit 17. For example, the desired-value storage unit 410 and the determination-table storage unit 411 are realized by the ROM, etc., included in the compensation circuit 17. Further, the obtaining unit 401, the averaging unit 402, the calculation unit 403, the detection unit 404, and the compensation unit 405 are realized by the CPU that executes programs stored in the ROM, etc., in the compensation circuit 17. The programs may be introduced in advance in the compensation circuit 17 and may be provided together with the compensation circuit 17, or may be provided separately from an external device, and then introduced to the compensation circuit 17. In the latter case, the programs may be provided by an external recording medium (e.g., USB memory, memory card, CD-ROM, or the like), or may be provided by downloading from a server in a network (e.g., the Internet, or the like). It should be noted that a part or all of the compensation circuit 17 may be realized by hardware. Further, the compensation circuit 17 may physically include a plurality of circuits.

(Processing Procedure of the Compensation Circuit 17)

Figure 5:
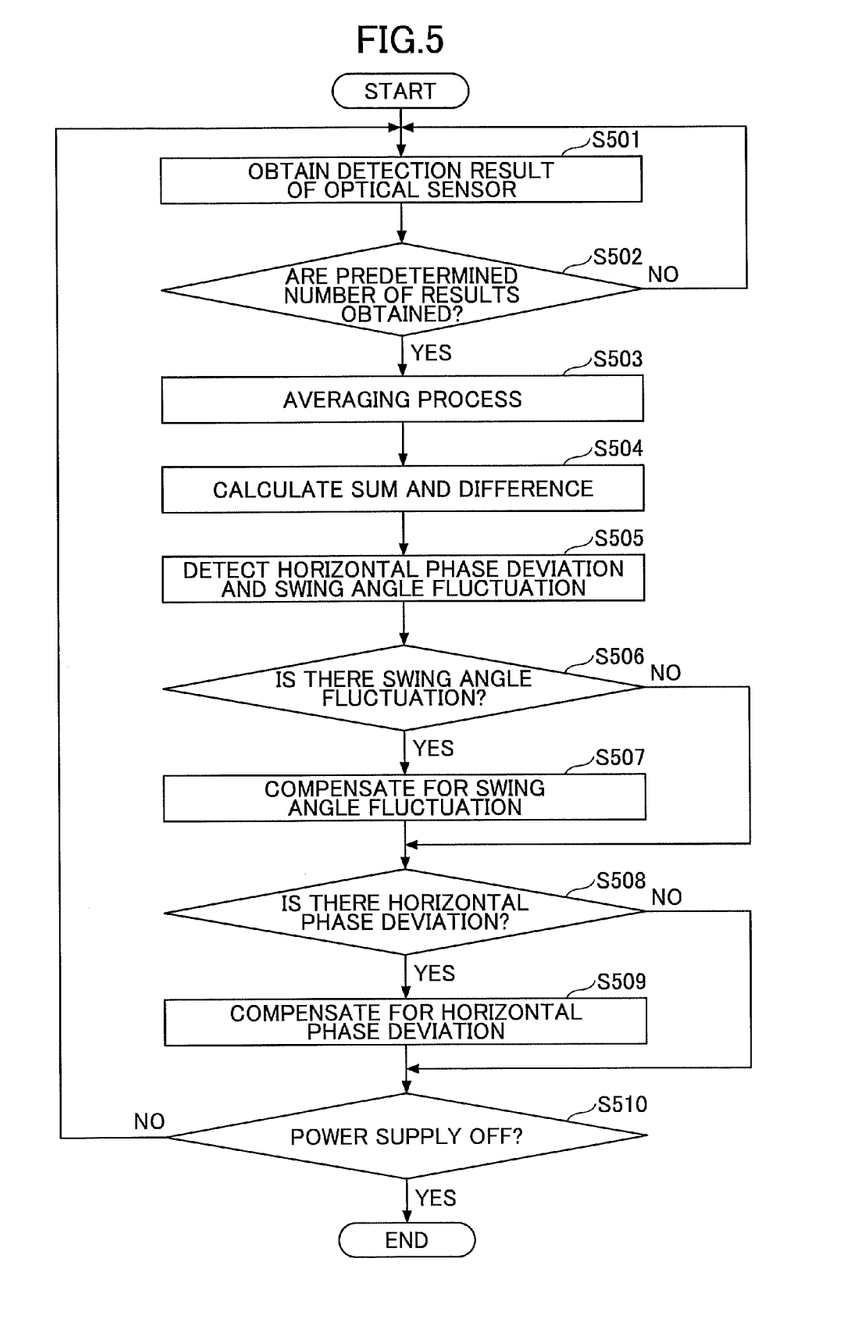
FIG. 5 is a flowchart illustrating a processing procedure of the compensation circuit.

FIG. 5 is a flowchart illustrating a processing procedure of the compensation circuit 17 according to an embodiment of the present invention. The process illustrated in FIG. 5 is executed by the compensation circuit 17 during a period, for example, from when the image projection apparatus 1 starts image projection to when the image projection apparatus 1 ends image projection (for example, during a period from when the power supply of the image projection apparatus 1 is turned ON to when it is turned OFF).

First, the obtaining unit 401 obtains detection results of the optical sensor 60 from the system controller 11 (step S501: obtaining step). Here, the obtained detection results of the optical sensor 60 are a pixel count value of the first pixel detected by the optical sensor 60 during the forward path of the horizontal scanning (a first pixel count value), and a pixel count value of the second pixel detected by the optical sensor 60 during the return path of the horizontal scanning (a second pixel count value).

Next, the averaging unit 402 determines whether a predetermined number of detection results of the optical sensor 60 (i.e., the first pixel count values and the second pixel count values) are obtained by the obtaining unit 401 (step S502: determining step). In step S502, in the case where it is determined that the predetermined number of the detection results are not obtained by the optical sensor 60 (step S502: No), the process of the compensation circuit 17 returns to step S501.

On the other hand, in the case where it is determined that the predetermined number of the detection results are obtained by the optical sensor 60 in step S502 (step S502: Yes), the averaging unit 402 performs the averaging process (step S503: averaging step). Specifically, the averaging unit 402 calculates an average value of the predetermined number of the first pixel count values and an average value of the predetermined number of the second pixel count values. Further, the calculation unit 403 calculates a sum of, and a difference between, the average value of the first pixel count values and the average value of the second pixel count values (step S504: calculating step).

Further, the detection unit 404 detects each of whether there is a phase deviation of the laser light in the horizontal scanning direction and whether there is a swing angle fluctuation of the MEMS mirror 310 based on: the sum and the difference calculated in step S504; the desired values stored in the desired-value storage unit 410; and the determination table stored in the determination-table storage unit 411 (step S505: detecting step).

After that, the compensation unit 405 determines whether the swing angle fluctuation of the MEMS mirror 310 has been detected (step S506). In step S506, in the case where it is determined that the swing angle fluctuation of the MEMS mirror 310 has been detected (step S506: Yes), the compensation unit 405 compensates for the swing angle fluctuation of the MEMS mirror 310 (step S507: compensating step), and the process of the compensation circuit 17 proceeds to step S508. On the other hand, in the case where it is determined that the swing angle fluctuation of the MEMS mirror 310 has not been detected in step S506 (step S506: No), the process of the compensation circuit 17 proceeds to step S508.

In step S508, the compensation unit 405 determines whether the phase deviation of the laser light in the horizontal scanning direction has been detected. In step S508, in the case where it is determined that the phase deviation of the laser light in the horizontal scanning direction has been detected (step S508: Yes), the compensation unit 405 compensates for the phase deviation of the laser light in the horizontal scanning direction (step S509: compensating step), and the process of the compensation circuit 17 proceeds to step S510. On the other hand, in the case where it is determined that the phase deviation of the laser light in the horizontal scanning direction has not been detected in step S508 (step S508: No), the process of the compensation circuit 17 proceeds to step S510.

In step S510, the compensation circuit 17 determines whether the power supply of the image projection apparatus 1 is turned OFF. In step S510, in the case where it is determined that the power supply of the image projection apparatus 1 is not turned OFF (step S510: No), the process of the compensation circuit 17 is returned to step S501. On the other hand, in the case where it is determined that the power supply of the image projection apparatus 1 is turned OFF in step S510 (step S510: Yes), the compensation circuit 17 ends a series of processes illustrated in FIG. 5.

It should be noted that, in the above-described procedure, in the case where the swing angle fluctuation and the phase deviation have been both detected, the compensation of the swing angle fluctuation is performed first. The order of compensation is not limited to the above. However, when the swing angle is adjusted, the phase deviation amount is also changed, and thus, it is preferable that the compensation of the swing angle fluctuation be performed first.

(An Example of the Determination Table)

Figure 6:
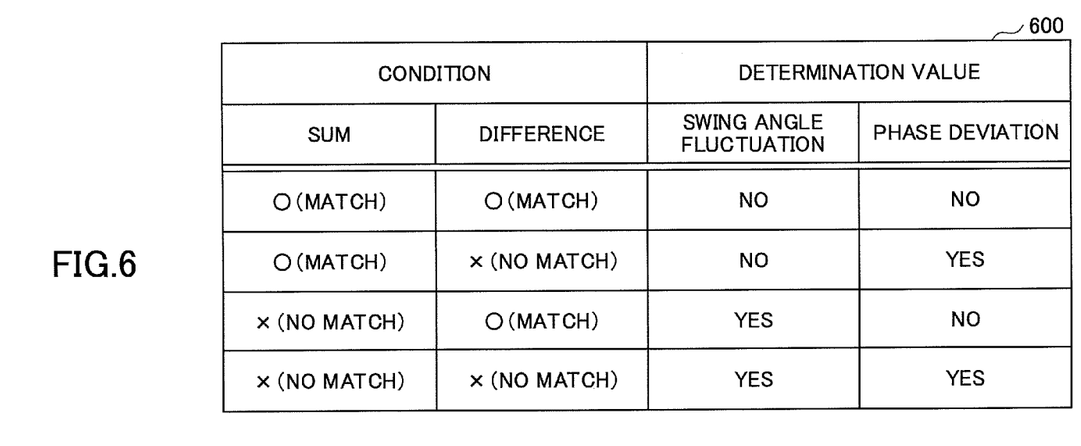
FIG. 6 is a drawing illustrating an example of a determination table stored in the compensation circuit.

FIG. 6 is a drawing illustrating an example of a determination table 600 stored in the compensation circuit 17 according to an embodiment of the present invention. The determination table 600 illustrated in FIG. 6 is an example of a determination table stored in the determination-table storage unit 411.

As illustrated in FIG. 6, in the determination table 600, "sum" and "difference" are included as conditions. In the "sum", "○ (match)" or "X (no match)" is set which indicates whether or not the sum of the first pixel count value detected during the forward path of the horizontal scanning and the second pixel count value detected during the return path of the horizontal scanning is deviated from the desired value. In the "difference", "○ (match)" or "X (no match)" is set which indicates whether or not the difference between the first pixel count value and the second pixel count value is deviated from the desired value. In the above-described "sum" and "difference", a case, in which the "sum" or the "difference" matches the desired value, is indicated by "○ (match)", and a case, in which the "sum" or the "difference" is deviated from the desired value (does not match the desired value), is indicated by "X (no match)". Further, in the determination table 600, "swing angle fluctuation" and "phase deviation" are included as determination values. In the "swing angle fluctuation", "Yes" or "No" is set which indicates whether or not there is a swing angle fluctuation of the MEMS mirror 310. In the "phase deviation", "Yes" or "No" is set which indicates whether or not there is a phase deviation of the laser light in the horizontal scanning direction.

For example, in an example of FIG. 6, in the case where the "sum" and the "difference" are both "○ (match)", "No" is set in each of the "swing angle fluctuation" and the "phase deviation". Further, in an example of FIG. 6, in the case where the "sum" is "○ (match)" and the "difference" is "X (no match)", "No" is set in the "swing angle fluctuation" and "Yes" is set in the "phase deviation". Further, in an example of FIG. 6, in the case where the "sum" is "X (no match)" and the "difference" is "○ (match)", "Yes" is set in the "swing angle fluctuation" and "No" is set in the "phase deviation". Further, in an example of FIG. 6, in the case where the "sum" and the "difference" are both "x (no match)", "Yes" is set in each of the "swing angle fluctuation" and the "phase deviation".

The above-described determination table 600 is used for determining whether or not there is a swing angle fluctuation and whether or not there is a phase deviation. With the above arrangements, it is easy for the detection unit 404 to determine whether or not there is a swing angle fluctuation of the MEMS mirror 310 and whether or not there is a phase deviation of the laser light in the horizontal scanning direction according to: the sum of the pixel count value during the forward path and the pixel count value during the return path; and the difference between the pixel count value during the forward path and the pixel count value during the return path.

(Specific Example of Compensation Method)

FIG. 7 through FIG. 10 are drawings illustrating specific examples (first example through fourth example) of a compensation method performed by the compensation circuit 17 according to an embodiment of the present invention. It should be noted that it is assumed that the desired value of the first pixel count value is "504" in each of the specific examples described below. Further, it is assumed that the desired value of the second pixel count value is "504". In other words, the optical sensor 60 is arranged in such a way that the 504th pixel from the left is detected by the optical sensor 60 during each of the forward path and the return path in the case where there is no swing angle fluctuation and where there is no phase deviation. Accordingly, it is assumed that, in the desired-value storage unit 410, "1008" is stored as the desired value of the sum and "0" is stored as the desired value of the difference. Further, it is assumed that a determination table similar to FIG. 6 is stored in the determination-table storage unit 411. Further, it is assumed that, in each of the specific examples, the first pixel count value and the second pixel count value are average values calculated by the averaging unit 402.

Figure 7:
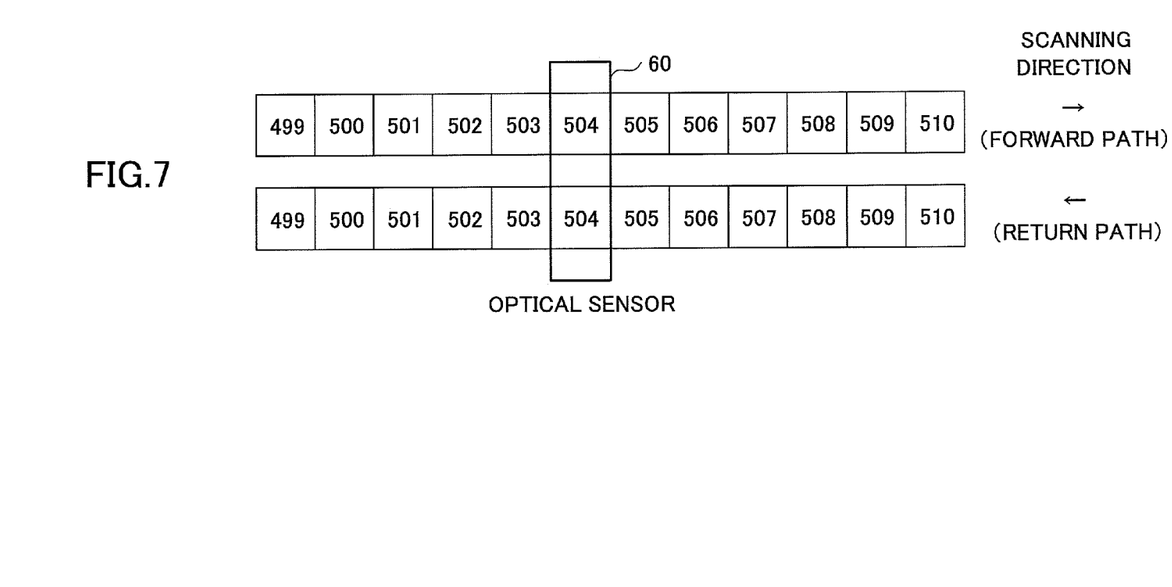
FIG. 7 is a drawing illustrating a specific example (first example) of a compensation method performed by the compensation circuit.

The first example illustrated in FIG. 7 is a case in which there is no swing angle fluctuation and there is no phase deviation. In the first example, the first pixel count value detected by the optical sensor 60 during the forward path of the horizontal scanning is "504". Further, the second pixel count value detected by the optical sensor 60 during the return path of the horizontal scanning is "504". In this case, "1008" is calculated as a sum of the first and the second pixel count values by the calculation unit 403. Further, "0" is calculated as a difference between the first and the second pixel count values by the calculation unit 403. In other words, the sum and the difference calculated by the calculation unit 403 are the same as the desired values stored in the desired-value storage unit 410, respectively. In this case, the detection unit 404 determines that "there is no swing angle fluctuation and there is no phase deviation" based on the determination table 600 illustrated in FIG. 6. Therefore, the compensation is not performed by the compensation unit 405.

Figure 8:
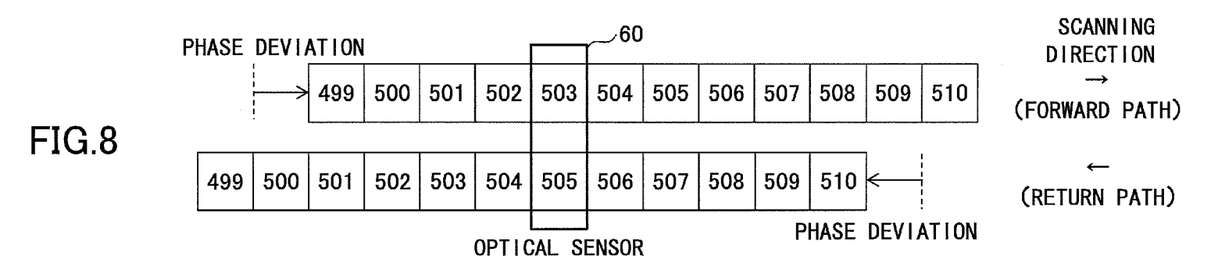
FIG. 8 is a drawing illustrating a specific example (second example) of a compensation method performed by the compensation circuit.

The second example illustrated in FIG. 8 is a case in which there is only a phase deviation. The deviation amount is one pixel. In the second example, the first pixel count value detected by the optical sensor 60 during the forward path of the horizontal scanning is "503". Further, the second pixel count value detected by the optical sensor 60 during the return path of the horizontal scanning is "505". In this case, "1008" is calculated as a sum of the first and the second pixel count values by the calculation unit 403. Further, "−2" is calculated as a difference between the first and the second pixel count values by the calculation unit 403. In other words, the sum calculated by the calculation unit 403 is the same as the desired value stored in the desired-value storage unit 410, but the difference calculated by the calculation unit 403 is different from the desired value stored in the desired-value storage unit 410. In this case, the detection unit 404 determines that "there is no swing angle fluctuation, but there is a phase deviation" based on the determination table 600 illustrated in FIG. 6. Therefore, the compensation only for the phase deviation, whose deviation is one pixel, is performed by the compensation unit 405.

Figure 9:
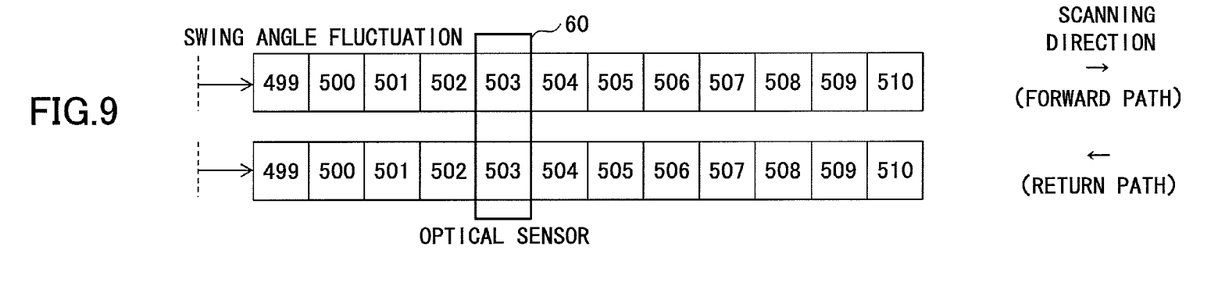
FIG. 9 is a drawing illustrating a specific example (third example) of a compensation method performed by the compensation circuit.

The third example illustrated in FIG. 9 is a case in which there is only a swing angle fluctuation. The fluctuation amount is one pixel. In the third example, the first pixel count value detected by the optical sensor 60 during the forward path of the horizontal scanning is "503". Further, the second pixel count value detected by the optical sensor 60 during the return path of the horizontal scanning is "503". In this case, "1006" is calculated as a sum of the first and the second pixel count values by the calculation unit 403. Further, "0" is calculated as a difference between the first and the second pixel count values by the calculation unit 403. In other words, the sum calculated by the calculation unit 403 is different from the desired value stored in the desired-value storage unit 410, but the difference calculated by the calculation unit 403 is the same as the desired value stored in the desired-value storage unit 410. In this case, the detection unit 404 determines that "there is a swing angle fluctuation, but there is no phase deviation" based on the determination table 600 illustrated in FIG. 6. Therefore, the compensation only for the swing angle fluctuation, whose fluctuation is one pixel, is performed by the compensation unit 405.

Figure 10:
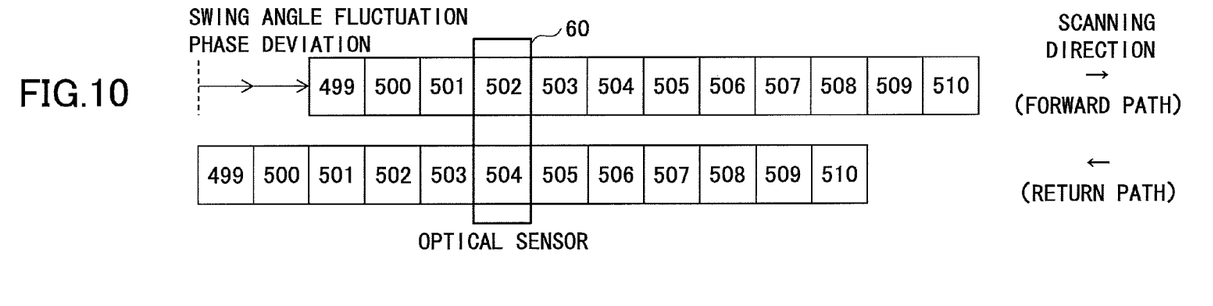
FIG. 10 is a drawing illustrating a specific example (fourth example) of a compensation method performed by the compensation circuit.

The fourth example illustrated in FIG. 10 is a case in which there are a phase deviation, whose deviation amount is one pixel, and a swing angle fluctuation, whose fluctuation amount is one pixel. In the fourth example, the first pixel count value detected by the optical sensor 60 during the forward path of the horizontal scanning is "502". Further, the second pixel count value detected by the optical sensor 60 during the return path of the horizontal scanning is "504". In this case, "1006" is calculated as a sum of the first and the second pixel count values by the calculation unit 403. Further, "−2" is calculated as a difference between the first and the second pixel count values by the calculation unit 403. In other words, the sum and the difference calculated by the calculation unit 403 are different from the desired values stored in the desired-value storage unit 410, respectively. In this case, the detection unit 404 determines that "there are a swing angle fluctuation and a phase deviation" based on the determination table 600 illustrated in FIG. 6. Therefore, the compensation for the phase deviation, whose deviation amount is one pixel, and the compensation for the swing angle fluctuation, whose fluctuation amount is one pixel, are performed by the compensation unit 405.

(Structure Example of the Screen 50)

Figure 11:
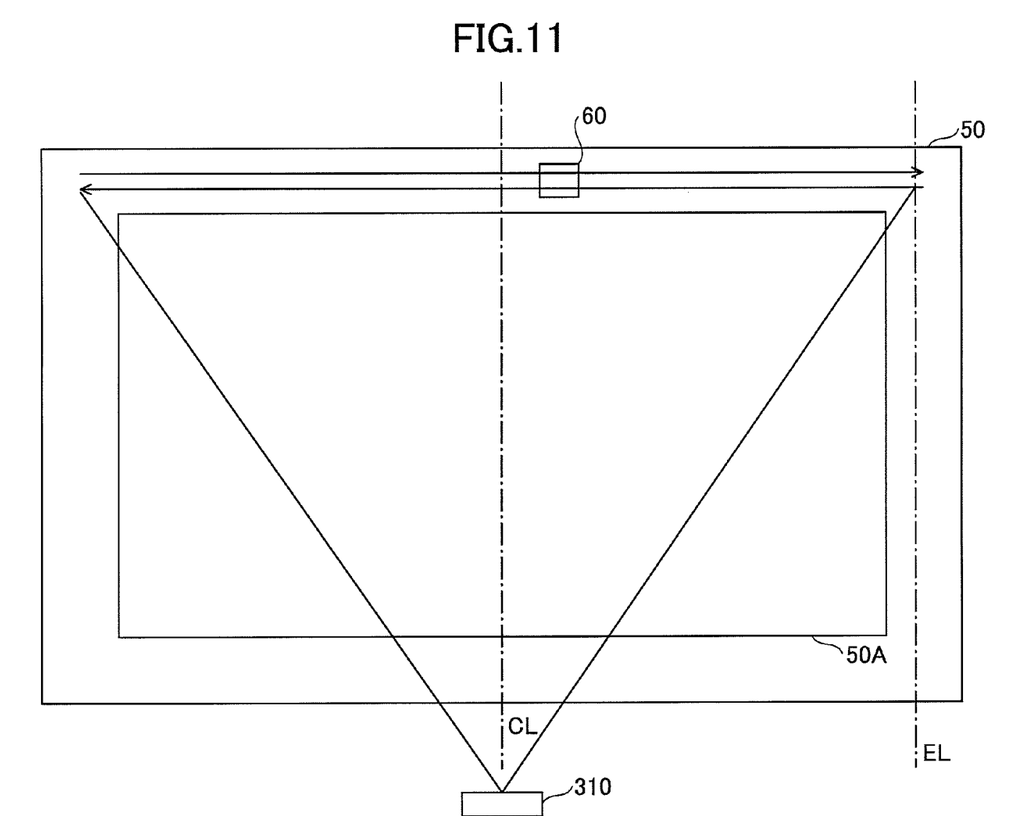
FIG. 11 is a drawing illustrating an example of a structure of a screen according to an embodiment of the present invention.

FIG. 11 is a drawing illustrating an example of a structure of a screen 50 according to an embodiment of the present invention. In an example illustrated in FIG. 11, there is a single optical sensor 60 arranged in an upper portion (horizontal scanning available area) outside of the drawing area 50A of the screen 50 (what is termed as a blanking area). For the area in which the optical sensor 60 is arranged, horizontal scanning is performed by using reference light emitted from the LD module 21 according to the control from the system controller 11. The optical sensor 60 outputs a pulse with High potential or Low potential while the reference light is being emitted onto the optical sensor 60. It should be noted that, as the reference light, reference light, which is used for constant light intensity control, may be used as is.

By using the above-described single optical sensor 60, an image projection apparatus 1 according to the present embodiment is enabled to detect each of the first pixel during the forward path (corresponding to "horizontal scanning in the first direction" in the present invention, or, the right arrow in the figure) of the horizontal scanning by the reference light, and the second pixel during the return path (corresponding to "horizontal scanning in the second direction" in the present invention, or, the left arrow in the figure) of the horizontal scanning by the reference light. Therefore, the image projection apparatus 1 is enabled to achieve detection of the first pixel and the second pixel with a relatively low cost configuration.

In particular, because the optical sensor 60 is arranged outside of the drawing area 50A, the image projection apparatus 1 is enabled to detect each of the first pixel and the second pixel during a time after a frame image is drawn in the drawing area 50A and before the next frame image is drawn. In other words, the image projection apparatus 1 is enabled to repeatedly perform the detection process by the detection unit 404 and the compensation process by the compensation unit 405 in a state in which the image projection apparatus 1 is being used normally. Therefore, it is not necessary for a user to perform adjustment manually or to be conscious of the necessity of adjustment.

Further, in an example illustrated in FIG. 11, the optical sensor 60 is arranged at a position shifted in the horizontal direction from a position on the center CL (center line of the screen 50) which is barely affected by the swing angle fluctuation of the MEMS mirror 310. Further, in an end portion EL of the swing angle, the fluctuation amount is small because the speed of the light scanning is slow, and thus, there is a possibility that the fluctuation cannot be detected. Therefore, it is preferable that the optical sensor 60 be arranged on the center CL side from the swing angle end portion EL. It is further preferable that the optical sensor 60 be arranged between the swing angle center CL and the end portion EL. With the above arrangement, the image projection apparatus 1 is enabled to sufficiently detect the swing angle fluctuation of the MEMS mirror 310.

(Summary)

As described above, an image projection apparatus 1 according to an embodiment of the present invention is enabled to detect and compensate for each of the phase deviation of the laser light in the horizontal scanning direction and the swing angle fluctuation of the MEMS mirror 310, according to a deviation, from the desired value, of the first pixel detected during the forward path of the horizontal scanning of the laser light, and a deviation, from the desired value, of the second pixel detected during the return path of the horizontal scanning of the laser light. Therefore, according to the image projection apparatus 1, it is possible to improve the accuracy of a position to which the laser light is emitted.

In particular, the image projection apparatus 1 is enabled to detect not only the first pixel but also the second pixel by using a single optical sensor 60. Further, the image projection apparatus 1 is enabled to detect and compensate for the swing angle fluctuation of the MEMS mirror 310 caused by the effects of the temperature and the atmospheric pressure, without using setting tables, etc., for respective temperatures and respective atmospheric pressures. Therefore, according to an image projection apparatus 1 according to an embodiment of the present invention, it is possible to achieve the detection of, and the compensation for, the phase deviation and the swing angle fluctuation with a relatively low cost configuration.

Further, in the image projection apparatus 1, a sum of, and a difference between, the first pixel count value and the second pixel count value are calculated, and the phase deviation and the swing angle fluctuation are detected according to whether there is a deviation of the sum from the desired value and whether there is a deviation of the difference from the desired value. Therefore, according to the image projection apparatus 1, it is only necessary to set in advance at least the desired values of the sum and the difference, and it is possible to detect the phase deviation and the swing angle fluctuation with a relatively simple configuration.

It should be noted that, in the above-described embodiment, a part or all of the functions included in the compensation circuit 17 (refer to FIG. 4) may be included in another circuit (e.g., system controller 11).

Further, in the above-described embodiment, an example is described in which the present invention is applied to, but not limited to, an image projection apparatus that uses a piezoelectric MEMS mirror. The present invention may be applied to an image projection apparatus that uses another drive type (e.g., electromagnetic type, electrostatic type, etc.,) MEMS mirror.

Further, in the above-described embodiment, the optical sensor 60 is arranged in the upper blanking area of the screen 50. However, the optical sensor 60 may be arranged in the lower blanking area of the screen 50. Further, the optical sensors 60 may be arranged both in the upper portion and in the lower portion of the screen 50. Further, the optical sensor 60 is arranged on the screen 50. However, the optical sensor 60 may be arranged outside the screen 50. In this case, the laser light emitted to the blanking area of the screen 50 may be reflected by an optical part or the like, guided to the outside of the screen 50, and detected by the optical sensor 60 that is arranged outside the screen 50.

Further, in the above-described embodiment, the phase deviation and the swing angle fluctuation are detected based on, but not limited to, the sum of, and the difference between, the first pixel count value and the second pixel count value. For example, a deviation of the first pixel count value from the desired value (first deviation) and a deviation of the second pixel count value from the desired value (second deviation) may be calculated without calculating the sum and the difference, and the phase deviation and the swing angle fluctuation may be detected based on the first deviation and the second deviation. In this case, a case, in which the first deviation and the second deviation are both "0", corresponds to a case in which the deviation of the sum from the desired value is "0" and the deviation of the difference from the desired value is "0" in the above-described embodiment.

Further, in the above-described embodiment, in the case where the predetermined number of the first pixel count values are averaged and the predetermined number of the second pixel count values are averaged, pixels, which are detected by the optical sensor 60 when the laser light with a specific wavelength (i.e., any one of the red light, the blue light, and the green light) is emitted, may be used as the first pixel and the second pixel. With the above arrangement, even in the case where the emission range of the laser light fluctuates because of the fluctuation of the wavelength, the predetermined number of the first pixels and the second pixels may be still detected in a fixed emission range without being affected by the above-described fluctuation of the emission range.

As described above, preferable embodiments of the present invention have been described in detail. However, the present invention is not limited to the above-described embodiments. Various variations and modifications may be possible within a range of the spirit of the present invention recited in the claims.

The present application is based on and claims the benefit of priority of Japanese Priority Application No. 2016-248465 filed on Dec. 21, 2016, the entire contents of which are hereby incorporated herein by reference.

What is claimed is:

1. An image projection apparatus comprising:
a light emission unit that emits laser light;
a light scanning unit that projects an image on a drawing area by reflecting the laser light and scanning the reflected laser light;
a light detection unit arranged outside of the drawing area;
a detection unit that detects, according to a deviation from a desired value of a first pixel detected by the light detection unit when the laser light is being horizontally scanned in a first direction and a deviation from a desired value of a second pixel detected by the light detection unit when the laser light is being horizontally scanned in a second direction, each of a phase deviation of the laser light in a horizontal scanning direction and a swing angle fluctuation of the light scanning unit; and
a compensation unit that changes emission start timing according to each of a phase deviation amount of the laser light in the horizontal scanning direction and a swing angle fluctuation amount of the light scanning unit detected by the detection unit.

2. The image projection apparatus according to claim 1, further comprising:

a calculation unit that detects a sum of and a difference between a pixel count value of the first pixel and a pixel count value of the second pixel, wherein the detection unit detects each of whether there is a phase deviation of the laser light in the horizontal scanning direction and whether there is a swing angle fluctuation of the light scanning unit according to a deviation of the sum calculated by the calculation unit from the desired value, and a deviation of the difference calculated by the calculation unit from the desired value.

3. The image projection apparatus according to claim 2, further comprising:

an averaging unit that calculates an average value of a predetermined number of pixel count values of the first pixel detected by the light detection unit and an average value of a predetermined number of pixel count values of the second pixel detected by the light detection unit, wherein the calculation unit calculates a sum of, and a difference between, the average value of the pixel count values of the first pixel and the average value of the pixel count values of the second pixel.

4. The image projection apparatus according to claim 3, wherein the averaging unit uses, as the first pixel and the second pixel, pixels detected by the light detection unit when the laser light with a specific wavelength is being scanned.

5. The image projection apparatus according to claim 1, wherein the light detection unit detects each of the first pixel and the second pixel by using a single optical sensor.

6. The image projection apparatus according to claim 1, further comprising:

a projection surface including the drawing area and an area outside of the drawing area, wherein the light detection unit is arranged in the area outside of the drawing area on the projection surface.

7. The image projection apparatus according to claim 6, wherein in a state in which the image projection apparatus is being used normally, a process by the detection unit and a process by the compensation unit are repeatedly performed.

8. The image projection apparatus according to claim 1, wherein the light detection unit is arranged at a position other than a swing angle center of the light scanning unit in the horizontal scanning direction.

9. The image projection apparatus according to claim 1, wherein the light detection unit is arranged at a position other than a swing angle end portion of the light scanning unit in the horizontal scanning direction.

10. The image projection apparatus according to claim 1, further comprising:

a temperature sensor, wherein the detection unit detects each of the phase deviation of the laser light in the horizontal scanning direction and the swing angle fluctuation of the light scanning unit by using the desired value according to a temperature detected by the temperature sensor.

11. A compensation method of an image projection apparatus, the apparatus including a light emission unit that emits laser light, and a light scanning unit that projects an image on a drawing area by reflecting the laser light and scanning the reflected laser light, for compensating for a position to which the laser light is emitted, the compensation method comprising:

detecting, according to a deviation from a desired value of a first pixel detected by the light detection unit at a predetermined position outside of the drawing area when the laser light is being horizontally scanned in a first direction and a deviation from a desired value of a second pixel detected by the light detection unit at the predetermined position when the laser light is being horizontally scanned in a second direction, each of a phase deviation of the laser light in a horizontal scanning direction and a swing angle fluctuation of the light scanning unit; and changing emission start timing according to each of a phase deviation amount of the laser light in the horizontal scanning direction and a swing angle fluctuation amount of the light scanning unit detected in the detecting.

* * * * *